(12) United States Patent
Sato

(10) Patent No.: US 12,483,337 B2
(45) Date of Patent: Nov. 25, 2025

(54) COMMUNICATION SYSTEM, RECEIVER, COMPENSATION AMOUNT CALCULATION APPARATUS, DISTORTION COMPENSATION METHOD, AND NON-TRANSITORY COMPUTER READABLE MEDIUM

(71) Applicant: NEC Corporation, Tokyo (JP)

(72) Inventor: Masaki Sato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 157 days.

(21) Appl. No.: 18/374,863

(22) Filed: Sep. 29, 2023

(65) Prior Publication Data
US 2024/0121007 A1    Apr. 11, 2024

(30) Foreign Application Priority Data
Oct. 7, 2022    (JP) .................................. 2022-162261

(51) Int. Cl.
*H04B 10/00* (2013.01)
*H04B 10/61* (2013.01)
*H04J 14/00* (2006.01)

(52) U.S. Cl.
CPC .............................. *H04B 10/6161* (2013.01)

(58) Field of Classification Search
CPC .............. H04B 10/616; H04B 10/6161; H04B 10/6162; H04B 10/6163; H04B 10/6164; H04B 10/6165
See application file for complete search history.

(56) References Cited

U.S. PATENT DOCUMENTS

2011/0280570 A1* 11/2011 Xia ..................... H04B 10/2513
                                                                    398/29
2021/0194587 A1*  6/2021 Cavaliere ........... H04B 10/2569

FOREIGN PATENT DOCUMENTS

JP    2017-092607 A    5/2017

OTHER PUBLICATIONS

Md. Saifuddin Faruk et al, "Multi-impairment monitoring from adaptive finite-impulse-response filters in a digital coherent receiver", Optics Express vol. 18, Issue 26, pp. 26929-26936 (2010).

* cited by examiner

*Primary Examiner* — Daniel G Dobson
(74) *Attorney, Agent, or Firm* — Sughrue Mion, P.LLC

(57) ABSTRACT

A distortion compensation filter whose filter coefficient is adaptively controlled compensates for a distortion included in a reception signal obtained by performing coherent reception of a signal transmitted from a transmitter in a receiver. A group delay ripple calculation device calculates a group delay included in the reception signal based on a filter coefficient of a distortion compensation filter and calculates group delay ripple from the calculated group delay. The feedback calculation unit calculates a phase response based on the calculated group delay ripple. The feedback calculation unit feeds the calculated phase response back to one or more filters having a phase compensation function disposed in a stage before an adaptive equalization filter included in the receiver, and causes one or more filters to at least partially compensate for the group delay ripple.

17 Claims, 15 Drawing Sheets

COMMUNICATION SYSTEM, RECEIVER, COMPENSATION AMOUNT CALCULATION APPARATUS, DISTORTION COMPENSATION METHOD, AND NON-TRANSITORY COMPUTER READABLE MEDIUM

INCORPORATION BY REFERENCE

This application is based upon and claims the benefit of priority from Japanese patent application No. 2022-162261, filed on Oct. 7, 2022, the disclosure of which is incorporated herein in its entirety by reference.

TECHNICAL FIELD

The preset disclosure relates to a communication system, a receiver, a compensation amount calculation apparatus, a distortion compensation method, and a non-transitory computer readable medium.

BACKGROUND ART

In order to achieve high spectral efficiency in optical fiber communication, multi-level modulation such as high-order quadrature amplitude modulation (QAM) has been adopted. Since introduction of digital coherent technology, it has become possible to perform flexible equalization signal processing on a receiver side by digital signal processing, such as by collectively compensating for chromatic dispersion (CD) accumulated in an optical fiber transmission path at the receiver side. Generally, however, a high-order multi-level modulation signal is susceptible to distortion. In order to secure the performance in a high-order modulation system, highly-accurate equalization processing is necessary.

As a related technique, Japanese Unexamined Patent Application Publication No. 2017-92607 discloses an optical reception device used for a digital coherent system. The optical reception device disclosed in Japanese Unexamined Patent Application Publication No. 2017-92607 includes a digital signal processing unit. The digital signal processing unit includes a CD compensation unit, an adaptive equalization unit, and a CD estimation circuit. The CD compensation unit suppresses waveform distortion caused by CD added to the optical signal in the optical fiber as a transmission path. The adaptive equalization unit adaptively compensates, for an optical signal output from the CD compensation unit, high-speed waveform deterioration occurring due to polarization fluctuation of the optical signal transmitted through the optical fiber. The adaptive equalization unit includes four finite impulse response (FIR) filters formed of a two-by-two butterfly configuration, each filter being a filter of N taps.

The CD estimation circuit calculates residual dispersion which could not be compensated for by the CD compensation unit from filter coefficients of the adaptive equalization unit, and outputs the calculated residual dispersion to the CD compensation unit. More specifically, the CD estimation circuit performs Fourier transform on a filter coefficient, integrates a frequency-differentiation result of the Fourier-transformed filter coefficient and a complex conjugate of the Fourier-transformed filter coefficient to calculate a matrix. The CD estimation circuit calculates a sum of two eigenvalues of the calculated matrix, and calculates a proportionality factor for frequency from the sum of the two eigenvalues. This proportionality factor is a value proportional to residual dispersion which could not be removed in the CD compensation unit. The CD compensation unit adds a fixedly preset first CD compensation amount with a second CD compensation amount for compensating for residual dispersion which cannot be compensated with only the first CD compensation amount, and performs the CD compensation so as to reduce the residual dispersion.

As another related technique, Non-Patent Literature 1 (Md. Saifuddin Faruk et al, Multi-impairment monitoring from adaptive finite-impulse-response filters in a digital coherent receiver, Optics Express Vol. 18, Issue 26, pp. 26929-26936 (2010)) discloses an algorithm for estimating linear impairments in an optical transmission system. Non-Patent Literature 1 discloses that linear impairments such as CD, polarization-mode dispersion (PMD), and polarization-dependent loss (PDL) can be compensated for by using four FIR filters structured in a two-by-two butterfly configuration. In Non-Patent Literature 1, linear impairments such as CD, PDL, differential-group delay (DGD), and second order PMD are calculated from FIR filter tap coefficients.

In Japanese Unexamined Patent Application Publication No. 2017-92607, the tap length of the FIR filter used in the adaptive equalization unit increases in proportion to the amount of linear degradation included in an optical signal. In Japanese Unexamined Patent Application Publication No. 2017-92607, the CD estimation circuit estimates residual CD, which is one of linear degradation, based on a filter coefficient of the adaptive equalization unit. The CD compensation unit compensates for the estimated residual dispersion, in addition to the fixedly preset CD. Accordingly, it can be considered that the amount of linear degradation included in the optical signal input to the adaptive equalization unit will be reduced and the tap length of the FIR filter can be reduced.

However, in Japanese Unexamined Patent Application Publication No. 2017-92607, degradation such as group delay ripple and so on that occur due to a dispersion slope of an optical fiber or frequency characteristics of the optical device is not taken into account. In order to compensate for the degradation of them, it is required that a FIR filter having a large tap length needs to be used for the adaptive equalization unit. Non-Patent Literature 1 only discloses that various linear impairments are calculated from a tap coefficient of the FIR filter, and does not disclose reduction of the tap length of the FIR filter.

SUMMARY

In view of the aforementioned circumstances, an object of the present disclosure is to provide a communication system, a receiver, a compensation amount calculation apparatus, a distortion compensation method, and a non-transitory computer readable medium capable of executing highly accurate distortion compensation while reducing a tap length in an adaptive equalization filter in which coefficients are adaptively controlled.

In order to accomplish the aforementioned object, a first aspect of the present disclosure provides a compensation amount calculation apparatus. The compensation amount calculation apparatus includes: a distortion compensation filter whose filter coefficient is adaptively controlled, thereby compensating for a distortion included in a reception signal obtained by performing coherent reception of a signal transmitted from a transmitter via a transmission path in a receiver; a group delay ripple calculation unit configured to calculate, based on the filter coefficient of the distortion compensation filter, a group delay included in the reception signal and calculate group delay ripple from the calculated group delay; and a feedback calculation unit configured to calculate a phase response based on the calculated group delay ripple, feed the calculated phase response back to one or more filters having a phase compensation function disposed in a stage before an adaptive equalization filter included in the receiver, and cause the one or more filters having the phase compensation function to at least partially compensate for the group delay ripple.

A second aspect of the present disclosure provides a receiver. The receiver includes: a reception circuit that performs coherent reception of a signal transmitted from a transmitter via a transmission path; and a chromatic dispersion compensation filter, which is a filter having a phase compensation function, that compensates for a distortion caused by chromatic dispersion included in the reception signal that is coherent-received; an adaptive equalization filter whose filter coefficient is adaptively controlled, thereby adaptively compensating for the distortion included in the reception signal in which the distortion has been compensated for by the chromatic dispersion compensation filter; a signal reproducing circuit configured to perform demodulation and decoding on the reception signal in which the distortion has been compensated for by the adaptive equalization filter; and the above compensation amount calculation apparatus.

A third aspect of the present disclosure provides a communication system. The communication system includes: a transmitter configured to transmit a signal via a transmission path; a receiver configured to receive the transmitted signal; and the above compensation amount calculation apparatus.

A fourth aspect of the present disclosure provides a distortion compensation method. The distortion compensation method includes: inputting, to a distortion compensation filter, a reception signal obtained by performing coherent reception of a signal transmitted from a transmitter via a transmission path by a receiver and adaptively controlling a filter coefficient of the distortion compensation filter, thereby compensating for a distortion included in the reception signal; calculating a group delay included in the reception signal based on the filter coefficient of the distortion compensation filter and calculating group delay ripple from the calculated group delay; and calculating a phase response based on the calculated group delay ripple and feeding the calculated phase response back to one or more filters having a phase compensation function disposed in a stage before an adaptive equalization filter included in the receiver, thereby causing the one or more filters having the phase compensation function to at least partially compensate for the group delay ripple.

A fifth aspect of the present disclosure provides a non-transitory computer readable medium. The non-transitory computer readable medium stores a program for causing a processor to execute processing including:
inputting, to a distortion compensation filter, a reception signal obtained by performing coherent reception of a signal transmitted from a transmitter via a transmission path by a receiver and adaptively controlling a filter coefficient of the distortion compensation filter, thereby compensating for a distortion included in the reception signal;
calculating a group delay included in the reception signal based on the filter coefficient of the distortion compensation filter and calculating group delay ripple from the calculated group delay; and
calculating a phase response based on the calculated group delay ripple and feeding the calculated phase response back to one or more filters having a phase compensation function disposed in a stage before an adaptive equalization filter included in the receiver, thereby causing the one or more filters having the phase compensation function to at least partially compensate for the group delay ripple.

BRIEF DESCRIPTION OF DRAWINGS

The above and other aspects, features and advantages of the present disclosure will become more apparent from the following description of certain exemplary embodiments when taken in conjunction with the accompanying drawings, in which.

EXAMPLE EMBODIMENT

Figure 1:
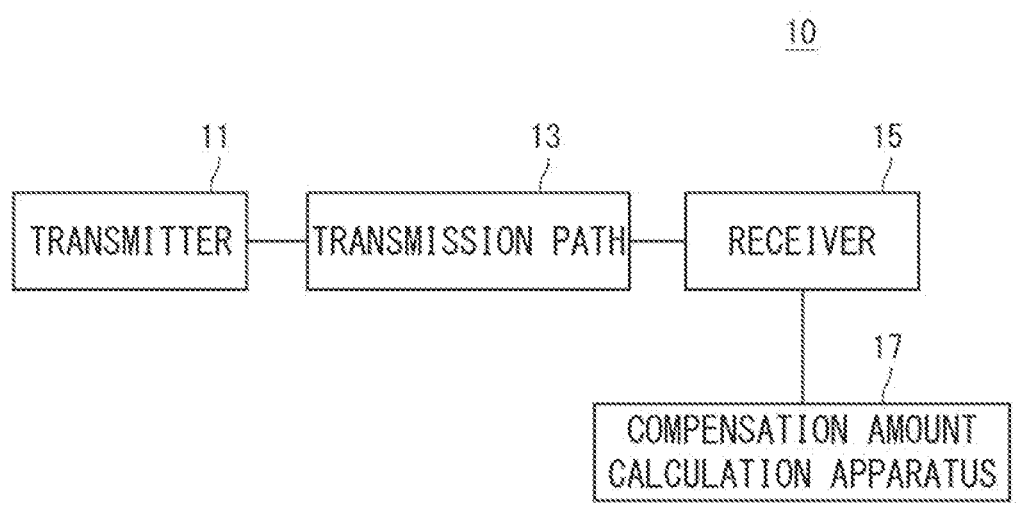
FIG. 1 is a block diagram schematically illustrating a communication system according to the present disclosure.

Prior to description of an example embodiment of the present disclosure, an outline of the present disclosure will be described. FIG. 1 schematically illustrates a communication system according to the present disclosure. A communication system 10 includes a transmitter 11, a receiver 15, and a compensation amount calculation apparatus 17. The transmitter 11 and the receiver 15 are connected to each other via a transmission path 13. The transmitter 11 transmits signals via the transmission path 13. The receiver 15 receives the signals transmitted from the transmitter 11 via the transmission path 13. The receiver 15 includes an adaptive equalization filter.

Figure 2:
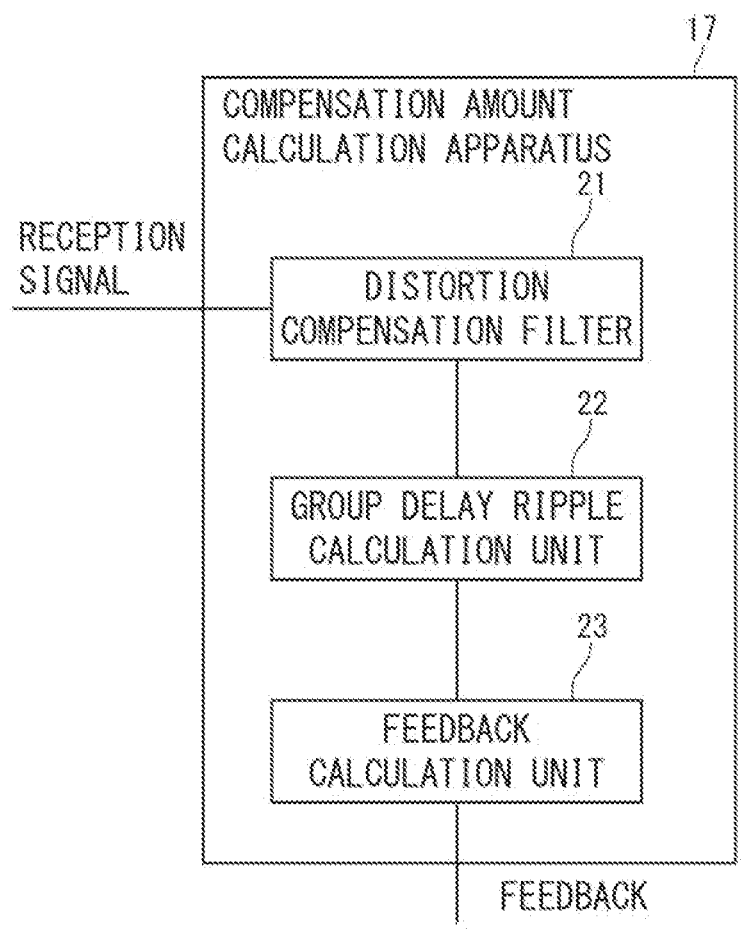
FIG. 2 is a block diagram illustrating a schematic configuration of a compensation amount calculation apparatus.

FIG. 2 illustrates a schematic configuration of the compensation amount calculation apparatus 17. The compensation amount calculation apparatus 17 includes a distortion compensation filter 21, a group delay ripple calculation unit 22, and a feedback calculation unit 23. A reception signal obtained by performing coherent reception of a signal transmitted from the transmitter 11 via the transmission path 13 in the receiver 15 is input to the distortion compensation filter 21. The distortion compensation filter 21 compensates for a distortion included in the reception signal. A filter coefficient of the distortion compensation filter 21 is adaptively controlled.

The group delay ripple calculation unit 22 calculates a group delay included in the reception signal based on the filter coefficient of the distortion compensation filter 21 and calculates group delay ripple from the calculated group delay. The feedback calculation unit 23 calculates a phase response based on the calculated group delay ripple. The feedback calculation unit 23 feeds the calculated phase response back to one or more filters having a phase compensation function, which is disposed in a stage before the adaptive equalization filter included in the receiver 15. The feedback calculation unit 23 feeds the phase response back to the one or more filters having the phase compensation function, thereby causing the one or more filters to at least partially compensate for the group delay ripple.

In this disclosure, the compensation amount calculation apparatus 17 feeds the phase response for compensating for the group delay ripple back to one or more filters having a phase compensation function. One or more filters having a phase compensation function compensates for group delay ripple included in the reception signal in a stage before the adaptive equalization filter of the receiver 15. The adaptive equalization filter performs adaptive equalization on the reception signal in which the group delay ripple is compensated for, and compensates for the distortion included in the reception signal. Group delay ripple of the signal input to the adaptive equalization filter is compensated for, and therefore the adaptive equalization filter is able to compensate for a distortion in a tap length shorter than that in a case where the group delay ripple is not compensated for. Therefore, the present disclosure is able to achieve highly accurate distortion compensation on the reception signal while decreasing the number of taps of the adaptive equalization filter.

Hereinafter, with reference to the drawings, example embodiments of the present disclosure will be described in detail. Since the following descriptions and the drawings are omitted and simplified as appropriate for the sake of clarification of the description. Further, in each of the following drawings, the same components and similar components are denoted by the same reference symbols and redundant descriptions will be omitted as necessary.

Figure 3:
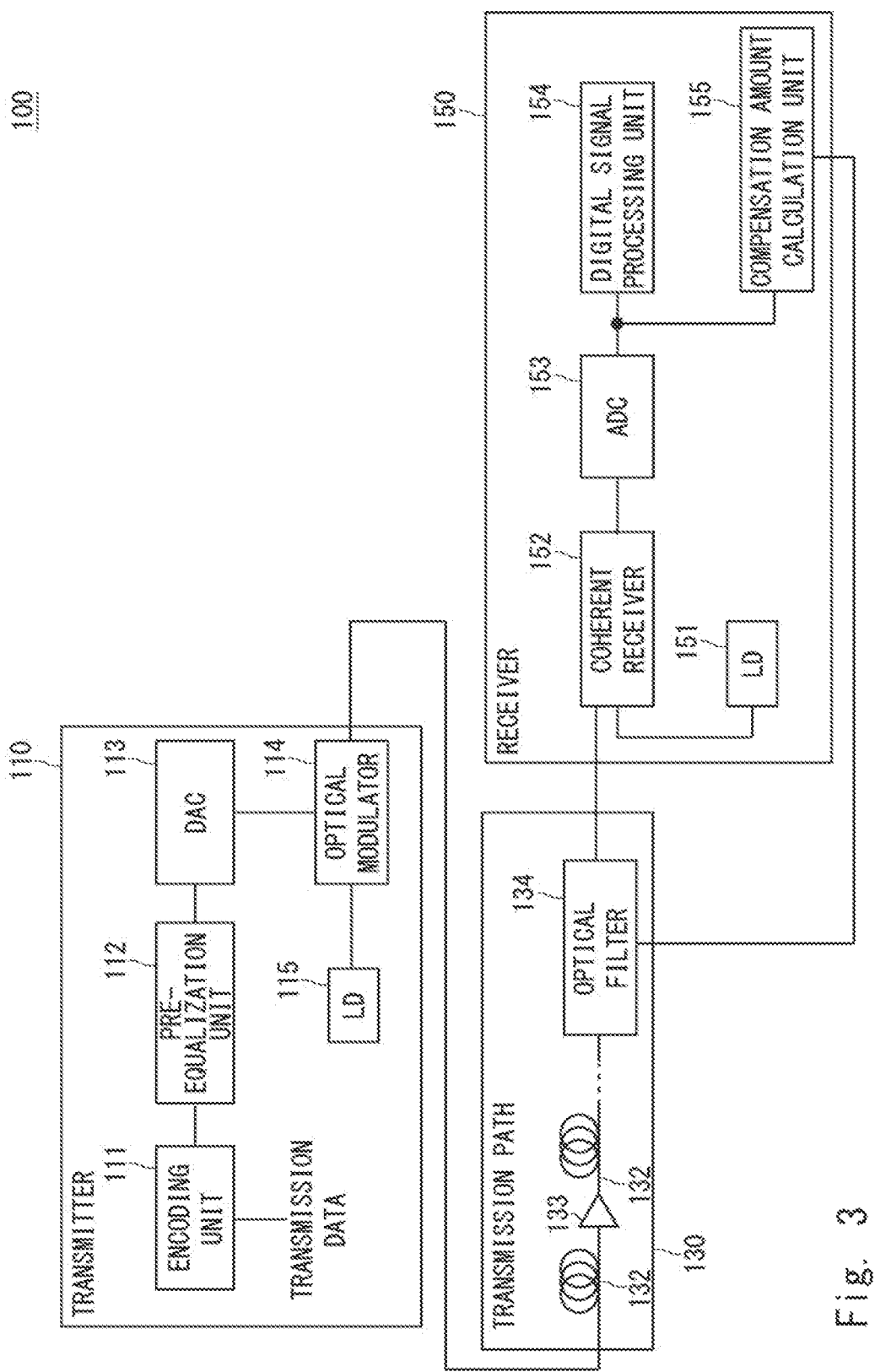
FIG. 3 is a block diagram illustrating a first communication system according to the present disclosure.

FIG. 3 illustrates a first communication system according to the present disclosure. It is assumed, in the first example embodiment, that the communication system is a backbone wavelength multiplexing optical transmission system using a digital coherent system in which an optical phase modulation system and a polarization multiplexing and demultiplexing technique are combined with each other. Specifically, it is assumed that the communication system is an optical fiber communication system in which a polarization multiplexing QAM system is adopted and which performs coherent reception. The optical fiber communication system 100 includes a transmitter 110, a transmission path 130, and a receiver 150. The optical fiber communication system 100 constitutes, for example, an optical submarine cable system. The optical fiber communication system 100 corresponds to the communication system 10 shown in FIG. 1. The transmitter 110 corresponds to the transmitter 11 shown in FIG. 1. The transmission path 130 corresponds to the transmission path 13 shown in FIG. 1. The receiver 150 corresponds to the receiver 15 shown in FIG. 1.

The transmitter 110 converts transmission data into a polarization multiplexed optical signal. The transmitter 110 includes an encoding unit 111, a pre-equalization unit 112, a digital analog converter (DAC) 113, an optical modulator 114, and a laser diode (LD) 115. The encoding unit 111, which is an encoder, encodes the transmission data and generates a signal sequence for optical modulation. In a case of the polarization multiplexing QAM system, the encoding unit 111 generates a total of four series of signals, i.e., an in-phase (I) component and a quadrature (Q) component of each of X-polarization (first polarization) and Y-polarization (second polarization). Note that, in FIG. 3, for the sake of simplification of the drawing, encoded four-series signals are illustrated as one solid line. Hereinafter, one solid line illustrated in FIG. 3 collectively represents signal series having a predetermined number, as a physical entity.

The pre-equalization unit 112, which is a pre-equalizer, performs pre-equalization for compensating for a distortion and the like of a device in a transmitter on the encoded four-series signals in advance. For example, a filter in which coefficients are fixedly preset is used as the pre-equalization unit 112. In general, a frequency domain equalizer (FDE) is used as the pre-equalization unit 112. The DAC 113 converts each of the four-series signals on which pre-equalization has been performed into an analog electric signal.

The LD 115 outputs continuous wave (CW) light. The optical modulator 114 modulates the CW light output from the LD 115 in response to the four-series signals output from the DAC 113, and generates an optical signal of polarization multiplexing QAM. The optical signal (polarization multiplexed optical signal) generated by the optical modulator 114 is output to the transmission path 130.

The transmission path 130 transmits the polarization multiplexed optical signal output from the transmitter 110 to the receiver 150. The transmission path 130 includes an optical fiber 132, an optical amplifier 133, and an optical filter 134. The optical fiber 132 guides the optical signal transmitted from the transmitter 110. The optical amplifier 133 amplifies the optical signal and compensates for a propagation loss in the optical fiber 132. The optical amplifier 133 is configured, for example, as an erbium doped fiber amplifier (EDFA). The optical filter 134 is a filter having a phase equalization function in addition to an amplitude equalization function. The optical filter 134 may be, for example, a wavelength selective switch (WSS) capable of switching a path of an optical signal having a desired wavelength of the wavelength-multiplexed optical signal to a desired path. The transmission path 130 may include a plurality of optical amplifiers 133 and a plurality of optical filters 134.

The receiver 150 includes an LD 151, a coherent receiver 152, an analog digital converter (ADC) 153, a digital signal processing unit 154, and a compensation amount calculation unit 155. The LD 151 outputs CW light as local oscillator light. In this example embodiment, the coherent receiver 152, which is a reception circuit, is configured as a polarization diversity type coherent receiver. The coherent receiver 152 performs coherent detection on the optical signal transmitted through the optical fiber 132 by using the CW light output from the LD 151. The coherent receiver 152 outputs four-series reception signals, that is, electric signals which are equivalent to the I component and Q component of the X-polarization and Y-polarization that have been coherent-detected.

The ADC 153 samples the reception signals output from the coherent receiver 152 and converts the reception signals into signals in a digital domain. The ADC 153 outputs the reception signals converted into the digital signals to each of the digital signal processing unit 154 and the compensation amount calculation unit 155. The digital signal processing unit 154 performs receiver-side equalization signal processing on the four-series reception signals sampled by the ADC 153. The digital signal processing unit 154 performs equalization signal processing on the reception signals, thereby compensating for various kinds of distortion in the optical fiber communication system. Further, the digital signal processing unit 154 performs decoding on the signals on which equalization signal processing has been executed, and restores the transmitted data. The digital signal processing unit 154 outputs the restored data to another circuit that is not shown.

Figure 4:
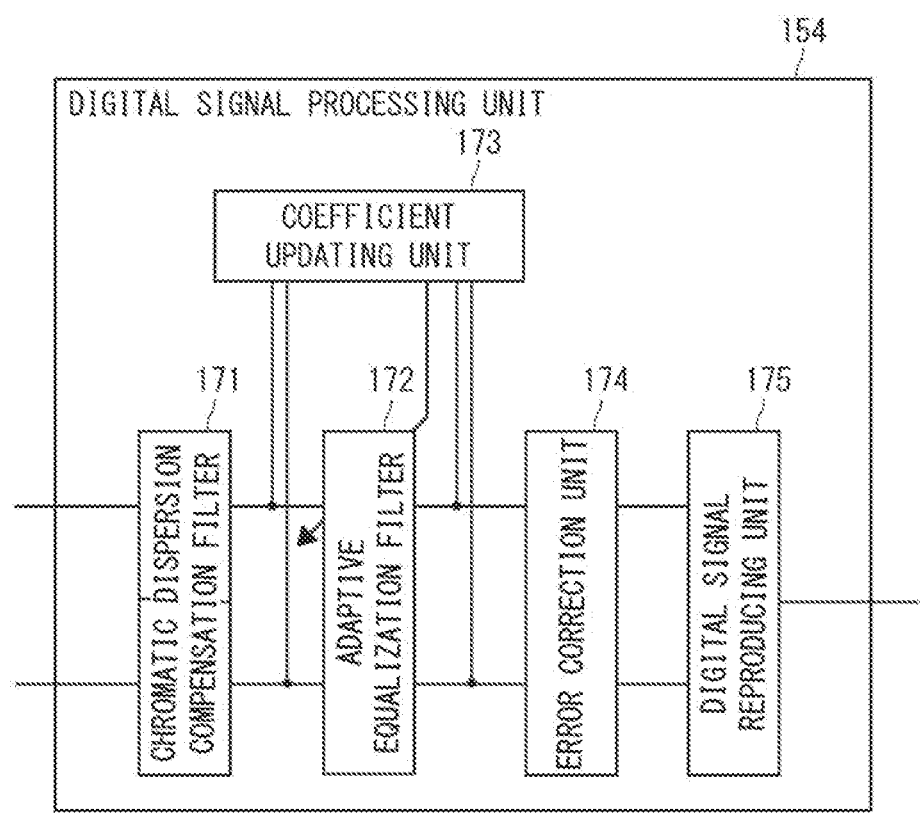
FIG. 4 is a block diagram illustrating a configuration example of a digital signal processing unit.

FIG. 4 illustrates a configuration example of the digital signal processing unit 154. In this example, the digital signal processing unit 154 includes a chromatic dispersion compensation filter 171, an adaptive equalization filter 172, a coefficient updating unit 173, an error correction unit 174, and a digital signal reproducing unit 175. The digital signal processing unit 154 may be configured using a device such as a digital signal processor (DSP). In the digital signal processing unit 154, at least the chromatic dispersion compensation filter 171 and the adaptive equalization filter 172 are implemented using hardware circuits.

The chromatic dispersion compensation filter 171 compensates for a signal distortion that occurs in an optical signal due to chromatic dispersion when the optical signal is transmitted through an optical fiber. The chromatic dispersion compensation filter 171, which is a frequency domain equalizer, compensates for, for each polarization, a signal distortion that occurs due to chromatic dispersion. Here, the chromatic dispersion of the transmission path is generally static unless processing for switching the transmission path is performed, and the model of the distortion is determined in accordance with the type of the optical fiber and the transmission distance. Therefore, the filter of the chromatic dispersion compensation filter 171 can be handled statically after once the coefficient is set in accordance with a chromatic dispersion amount to be compensated for.

The adaptive equalization filter 172 compensates for various kinds of signal distortion included in the signal in which the signal distortion which occurs due to chromatic dispersion has been compensated for by the chromatic dispersion compensation filter 171. The coefficient updating unit 173 adaptively updates the filter coefficient of the adaptive equalization filter 172. The coefficient updating unit 173 updates, for example, the coefficient of the adaptive equalization filter 172 for each sample at each time or for each symbol based on the input signal of the adaptive equalization filter 172 and the output signal of the adaptive equalization filter 172. The coefficient updating unit 173 calculates the difference between the output of the adaptive equalization filter 172 and the desired state as a loss function. The coefficient updating unit 173 sequentially updates, for example, the coefficient of the adaptive equalization filter 172 in such a way that the loss function is minimized. Any known method may be used to update coefficients.

Figure 5:
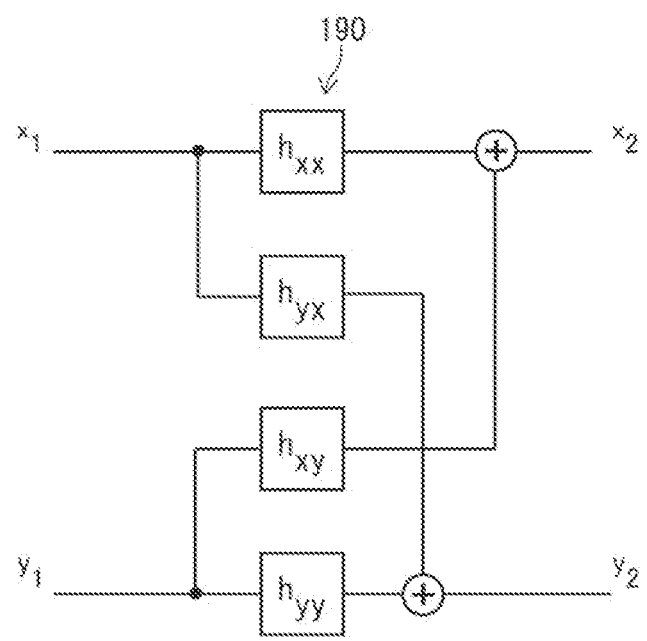
FIG. 5 is a block diagram illustrating a configuration example of an adaptive equalization filter.

FIG. 5 illustrates a configuration example of the adaptive equalization filter 172. In this example, the adaptive equalization filter 172 is configured as a MIMO equalizer including a multi-input-multi-output (MIMO) filter. The adaptive equalization filter 172 includes four FIR filters 190. A complex signal of the X-polarization component output from the chromatic dispersion compensation filter 171 is denoted by $x_1$ and a complex signal of the Y-polarization component output from the chromatic dispersion compensation filter 171 is denoted by $y_1$. Further, filter coefficients of the respective FIR filters are denoted by $h_{xx}$, $h_{yx}$, $h_{yy}$, and $h_{xy}$. In this case, a complex signal $x_2$ of the X-polarization component output from the adaptive equalization filter 172 and a complex signal $y_2$ of the Y-polarization component can be expressed by the following expressions.

$$x_2 = h_{xx} x_1 + h_{xy} y_1$$

$$y_2 = h_{yx} x_1 + h_{yy} y_1$$

The error correction unit 174 executes error correction processing on a reception signal output from the adaptive equalization filter 172. The digital signal reproducing unit 175 reproduces data encoded on the transmitter side from the reception signal on which the error correction has been executed. The digital signal reproducing unit 175 includes, for example, a demodulator that demodulates a reception signal, and a decoder that decodes data from the demodulated signal.

The compensation amount calculation unit 155 acquires the branched reception signal from the ADC 153 (see FIG. 3). The compensation amount calculation unit 155 calculates group delay ripple included in the reception signal. The compensation amount calculation unit 155 feeds the compensation amount for compensating for the group delay ripple back to a filter having a phase equalization function on a signal path from data transmission to data reproduction. In this example embodiment, the compensation amount calculation unit 155 feeds the compensation amount for compensating for the group delay ripple back to the optical filter 134 having a phase equalization function. The compensation amount calculation unit 155 corresponds to the compensation amount calculation apparatus 17 shown in FIG. 1.

Figure 6:
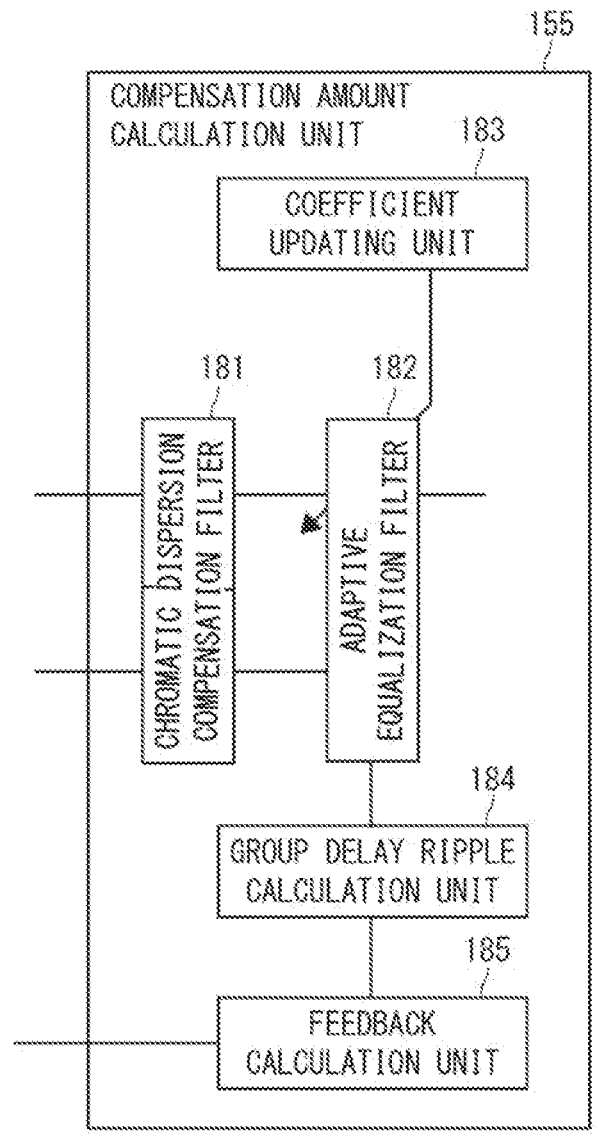
FIG. 6 is a block diagram illustrating a configuration example of a compensation amount calculation unit.

FIG. 6 illustrates a configuration example of the compensation amount calculation unit 155. The compensation amount calculation unit 155 includes a chromatic dispersion compensation filter 181, an adaptive equalization filter 182, a coefficient updating unit 183, a group delay ripple calculation unit 184, and a feedback calculation unit 185.

Unlike the digital signal processing unit 154, the compensation amount calculation unit 155 does not need to reproduce data encoded on the transmitter side. Therefore, high-speed processing by hardware is not required for the compensation amount calculation unit 155. The compensation amount calculation unit 155 is formed, for example, as a device having a processor and a memory. The processor executes an instruction stored in the memory, whereby at least some of the functions of each part in the compensation amount calculation unit 155 may be implemented with software. In particular, in this example embodiment, the chromatic dispersion compensation filter 181 and the adaptive equalization filter 182 may be implemented by software. The compensation amount calculation unit 155 may be formed using a device such as DSP, like the digital signal processing unit 154.

The chromatic dispersion compensation filter 181 compensates for a signal distortion that occurs in an optical signal caused due to chromatic dispersion when the optical signal is transmitted through the optical fiber. The chromatic dispersion compensation filter 181, which is a frequency domain equalizer, compensates for, for each polarization, a signal distortion that occurs due to chromatic dispersion. The filter coefficient of the chromatic dispersion compensation filter 181 may be the same as the chromatic dispersion compensation filter 171 (see FIG. 4) included in the digital signal processing unit 154. Since it is not necessary for the compensation amount calculation unit 155 to reproduce all the received data pieces, it is not necessary that all the reception signals be input to the compensation amount calculation unit 155. A part of the reception signal, for example, a known signal such as a pilot signal, may be input to the compensation amount calculation unit 155.

The adaptive equalization filter 182 compensates for various kinds of signal distortion included in a signal in which signal distortion caused due to chromatic dispersion has been compensated for by the chromatic dispersion compensation filter 181. The coefficient updating unit 183 adaptively updates the filter coefficient of the adaptive equalization filter 182. The coefficient updating unit 183 updates, for example, the coefficient of the adaptive equalization filter 182 for each sample at each time or for each symbol based on the input signal of the adaptive equalization filter 182 and the output signal of the adaptive equalization filter 182. Any known method may be used to update coefficients. The adaptive equalization filter 182 corresponds to the distortion compensation filter 21 shown in FIG. 2.

In this example embodiment, the adaptive equalization filter 182 is used to calculate the group delay ripple, not for the purpose of improving the reception performance. In this example embodiment, an optical signal that is polarization-multiplexed in a transmission path is used, and the reception signal includes an X-polarization component and a Y-polarization component. Since the group delay ripple does not depend on polarizations, it is not necessary that group delay ripple be calculated in both polarizations, and may be calculated in one of the polarizations, for example, in X-polarization. Accordingly, a 2×1 multi-input-single-output (MISO) filter may be used, not a 2×2 MIMO filter, as the adaptive equalization filter 182. When the group delay ripple is calculated in X-polarization, the amount of calculation in the update of the filter coefficient can be reduced compared to a case in which group delay ripple is calculated in both the X-polarization and the Y-polarization.

Figure 7:
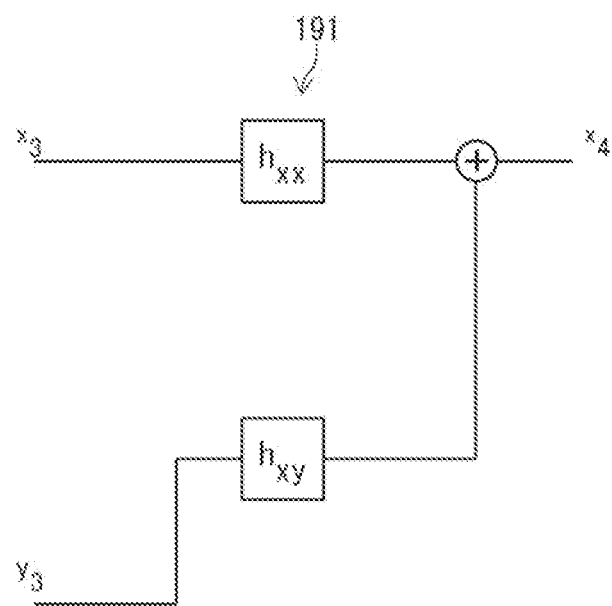
FIG. 7 is a block diagram illustrating a configuration example of an adaptive equalization filter.

FIG. 7 illustrates a configuration example of the adaptive equalization filter 182. In this example, the adaptive equalization filter 182 includes a 2×1 MISO filter. The adaptive equalization filter 182 includes two FIR filters 191. A complex signal of the X-polarization component output from the chromatic dispersion compensation filter 181 is denoted by $x_3$ and a complex signal of the Y-polarization component output from the chromatic dispersion compensation filter 181 is denoted by $y_3$. Further, filter coefficients of the respective FIR filters are denoted by $h_{xx}$ and $h_{xy}$. In this case, a complex signal $x_4$ of the X-polarization component output from the adaptive equalization filter 182 can be expressed by the following expression.

$$x_4 = h_{xx} x_3 + h_{xy} y_3$$

The tap length of the FIR filter 191 in the adaptive equalization filter 182 is set to be larger than the tap length of the FIR filter 190 (see FIG. 5) in the adaptive equalization filter 172 in the digital signal processing unit 154. In this case, the adaptive equalization filter 182 is able to execute distortion compensation more accurate than that in the adaptive equalization filter 172 in the digital signal processing unit 154.

The group delay ripple calculation unit 184 calculates the group delay ripple from the filter coefficient of the adaptive equalization filter 182. Specifically, the group delay ripple calculation unit 184 calculates a complex frequency response $H_{xx}(\omega)$ from the filter coefficient $h_{xx}$ of the above MISO filter. The complex frequency response $H_{xx}(\omega)$ can be calculated from the following expressions.

$$H_{xx}(\omega) = F[h_{xx}]$$

$$H_{xx}(\omega) = |H_{xx}(\omega)| e^{j\theta(\omega)}$$

In the above expressions, F denotes Fourier transform, $|H_{xx}(\omega)|$ denotes an amplitude response, and $\theta(\omega)$ denotes a phase response. The phase response $\theta(\omega)$ can be calculated from the following expression.

$$\theta(\omega) = \tan^{-1}\left(\frac{\operatorname{Im}(H_{xx}(\omega))}{\operatorname{Re}(H_{xx}(\omega))}\right)$$

The group delay ripple calculation unit 184 calculates the group delay $\tau(\omega)$ from the phase response $\theta(\omega)$ using the following expression.

$$\tau(\omega) = -\frac{d\theta(\omega)}{d\omega}$$

Further, the group delay ripple calculation unit 184 calculates the group delay ripple $\tau_r(\omega)$ from the group delay $\tau(\omega)$ using the following expression.

Figure 8:
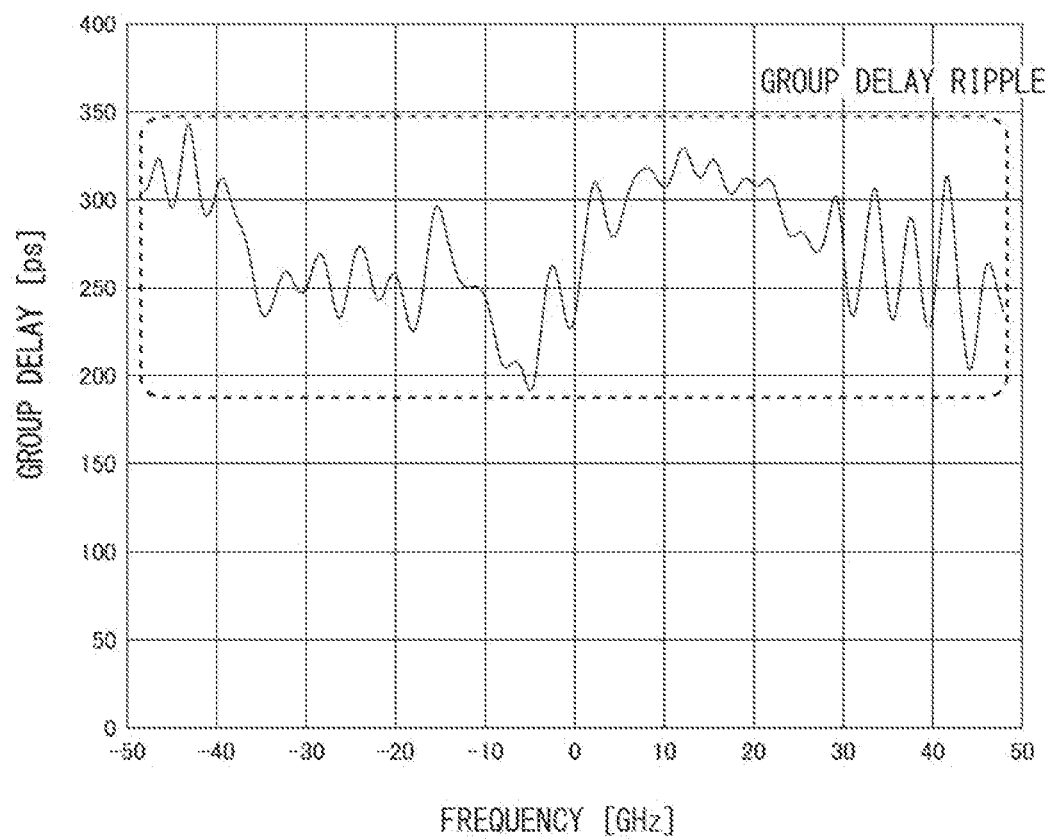
FIG. 8 is a graph illustrating a group delay.

$\tau_r(\omega) = \tau(\omega) - \bar{\tau}$, where $\bar{\tau}$ represents an average of the group delay FIG. 8 is a graph illustrating a group delay. In FIG. 8, the horizontal axis indicates a frequency [GHz] and the vertical axis indicates a group delay [ps]. In FIG. 8, a part surrounded by the dashed line corresponds to the group delay ripple. The group delay ripple calculation unit 184 may apply averaging processing to the group delay ripple $\tau_r(\omega)$ calculated above. Alternatively, the group delay ripple calculation unit 184 may apply removal of out-band noise to the group delay ripple $\tau_r(\omega)$ calculated above.

The feedback calculation unit 185 converts the group delay ripple calculated by the group delay ripple calculation unit 184 into a compensation amount applied to the optical filter 134 (see FIG. 3) in the transmission path 130. Specifically, the feedback calculation unit 185 converts the group delay ripple $\tau_r(\omega)$ calculated above into a phase response $\varphi(\omega)$ using the following expression.

$$\varphi(\omega) = -\int \tau_r(\omega) d\omega$$

The feedback calculation unit 185 feeds the phase response $\varphi(\omega)$ back to the optical filter 134. The optical filter 134 performs, besides fixedly preset distortion compensation, compensation of group delay ripple based on the phase response that has been fed back. The group delay ripple calculation unit 184 corresponds to the group delay ripple calculation unit 22 shown in FIG. 2. The feedback calculation unit 185 corresponds to the feedback calculation unit 23 shown in FIG. 2.

Figure 9:
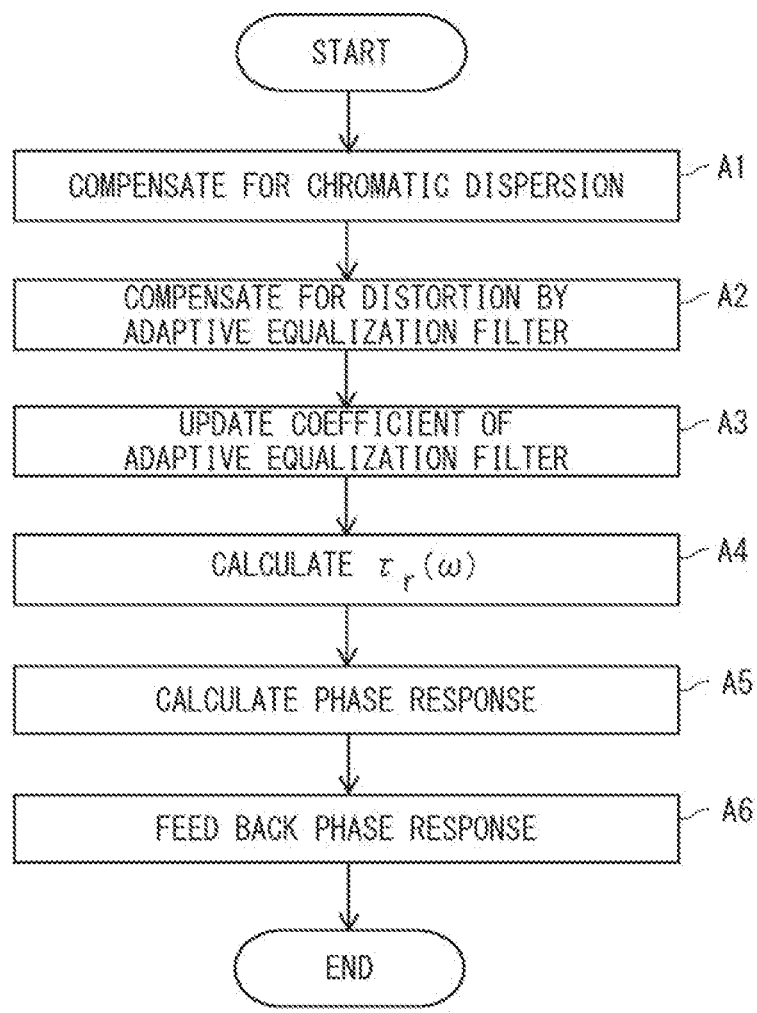
FIG. 9 is a flowchart illustrating an operation procedure of the compensation amount calculation unit.

Next, an operation procedure according to this example embodiment will be described. FIG. 9 illustrates an operation procedure of the compensation amount calculation unit 155. The operation procedure of the compensation amount calculation unit 155 corresponds to the distortion compensation method. A reception signal converted into a digital signal by the ADC 153 (see FIG. 3) is input to the chromatic dispersion compensation filter 181. The chromatic dispersion compensation filter 181 compensates for the chromatic dispersion (Step A1) and outputs the reception signal in which the chromatic dispersion is compensated to the adaptive equalization filter 182. The adaptive equalization filter 182 compensates for various kinds of distortion included in the reception signal (Step A2). The coefficient updating unit 183 adaptively updates the coefficient of the adaptive equalization filter 182 (Step A3).

The group delay ripple calculation unit 184 calculates the group delay ripple $\tau_r(\omega)$ from the coefficient of the adaptive equalization filter 182 (Step A4). The feedback calculation unit 185 calculates the phase response from the group delay ripple $\tau_r(\omega)$ calculated in Step A4 (Step A5). The feedback calculation unit 185 feeds the phase response calculated in Step A5 back to the optical filter 134 (Step A6). The optical filter 134 compensates for the group delay ripple based on the phase response that has been fed back.

Here, the temporal change in the group delay ripple is relatively slow, and it is not absolutely necessary to compensate for group delay ripple using the adaptive equalization filter 172 of the digital signal processing unit 154 implemented by a hardware circuit. Therefore, in this example embodiment, group delay ripple is calculated using the adaptive equalization filter 182 implemented by software and the group delay ripple is compensated for in the optical filter 134. In this example embodiment, the receiver 150 receives an optical signal in which the group delay ripple has been compensated from the transmission path 130. In the digital signal processing unit 154, the reception signal in which the group delay ripple is compensated for is input to the adaptive equalization filter 172.

The advantage for compensating for the group delay ripple, not the coefficient $h_{xx}$ of the 2×1 MISO filter, in the optical filter 134 can be explained as follows. A complex frequency response $H_{xx}(\omega)=|H_{xx}(\omega)|e^{j\theta(\omega)}$ of the coefficient $h_{xx}$ includes an amplitude response $|H_{xx}(\omega)|$ and a phase response $\theta(\omega)$, and they may be fed back to the optical filter 134 and compensated for. However, the amplitude response does not have a large influence on the signal quality, unlike the phase response does. Further, the amplitude response can be compensated for in a tap length shorter than that in a case in which a phase response is compensated for. Therefore, it is not absolutely necessary to compensate for the amplitude response in the optical filter 134. Further, the amplitude response derived by the 2×1 MISO filter fluctuates due to the influence of polarization fluctuation or polarization-dependent loss. Therefore, when the amplitude response is statically compensated for in the optical filter 134, it is possible that degradation in the quality may occur due to the compensation of the amplitude response.

Further, an advantage for compensating group delay ripple, not group delay, in the optical filter 134 can be explained as follows. Factors that cause degradation in the signal quality are group delay ripple components, and it is not absolutely necessary to compensate for the group delay itself in the optical filter 134. When group delay is compensated for in the optical filter 134, an optical filter having a wide phase compensation range is required for the optical filter 134. Since group delay ripple is compensated for, not group delay itself, an optical filter whose phase compensation range is not really wide can be used as the optical filter 134.

In this example embodiment, the group delay ripple calculation unit 184 calculates, from the adaptive equalization filter 182, that is, from the filter response of the 2×1 MISO filter, group delay ripple compensated for by the adaptive equalization filter 182. The group delay ripple includes a residual chromatic dispersion a dispersion slope, and a phase fluctuation component such as a frequency response of the optical device, which cannot be compensated for by the chromatic dispersion compensation filter 181 that is positioned in a stage before the 2×1 MISO filter.

The feedback calculation unit 185 converts the group delay ripple into a phase response and feeds the phase response after the conversion back to the optical filter 134 having a phase equalization function.

Figure 10:
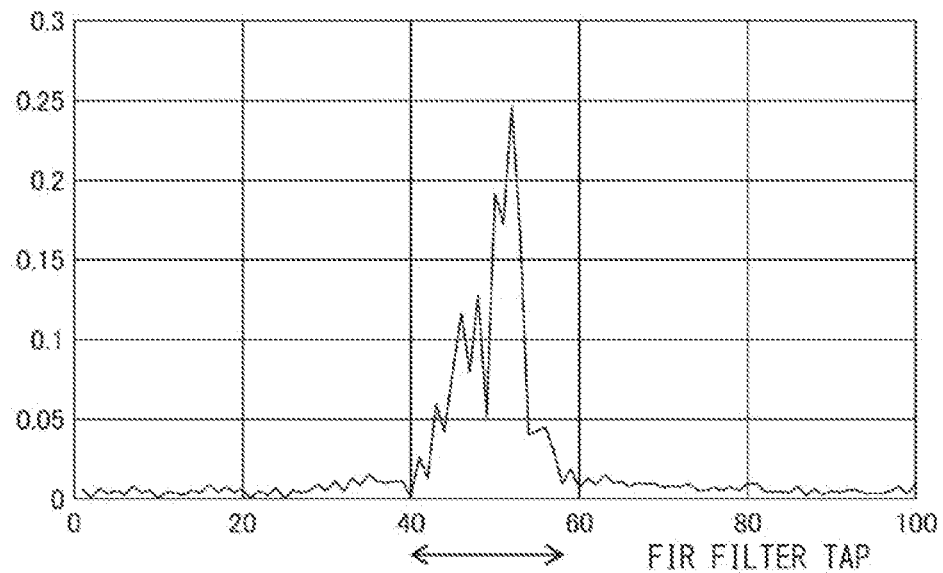
FIG. 10 is a graph illustrating an example of a filter response of the adaptive equalization filter.

It is possible to collectively compensate for effects of linear degradation that are caused by an optical transmission path or an optical device on the optical transmission path on the receiver side by using a 2×2 MIMO adaptive equalization filter. However, in this case, a tap length that is required for the adaptive equalization filter increases in proportion to the amount of linear degradation. FIG. 10 illustrates a filter response of a 2×2 MIMO filter in a case where the group delay ripple is not compensated for in the optical filter 134, that is, a filter response of the adaptive equalization filter 172. In FIG. 10, the horizontal axis indicates the number of taps in the FIR filter and the vertical axis indicates the intensity. As shown in FIG. 10, in order to collectively compensate for effects of linear degradation on the receiver side, a tap length of about 20 taps is required for the adaptive equalization filter 172.

Figure 11:
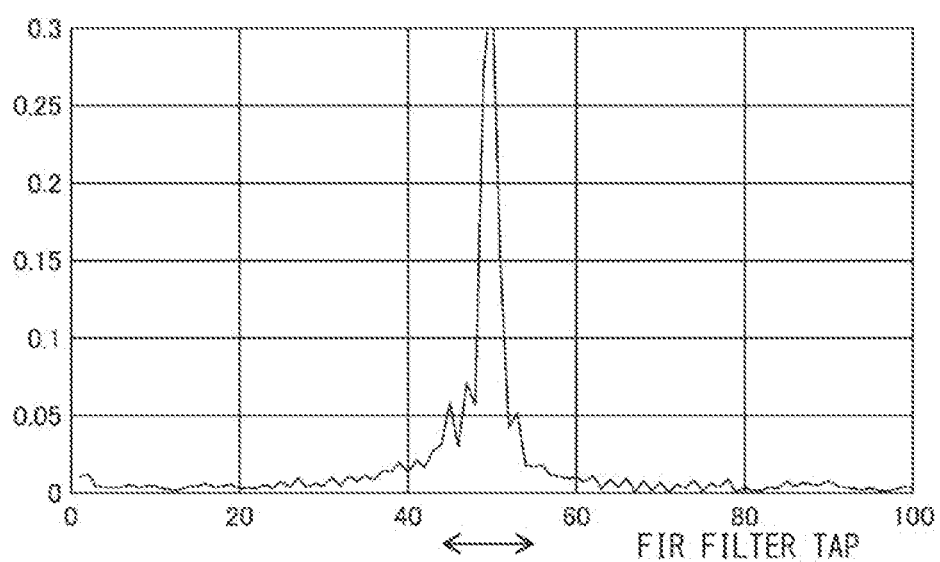
FIG. 11 is a graph illustrating another example of the filter response of the adaptive equalization filter.

FIG. 11 illustrates a filter response of the adaptive equalization filter 172 in a case where group delay ripple is compensated for in the optical filter 134. In FIG. 11, the horizontal axis indicates the number of taps of the FIR filter and the vertical axis indicates the intensity. As shown in FIG. 11, when group delay ripple is compensated for in the optical filter 134, the filter response becomes steeper than that in a case where the group delay ripple is not compensated for. When the group delay ripple is compensated for in the optical filter 134, the tap length required for the adaptive equalization filter 172 is about 10. That is, it is possible to conduct highly accurate distortion compensation with a short tap length.

As described above, when group delay ripple is compensated for in the optical filter 134 disposed before the adaptive equalization filter 172, the tap length required for the adaptive equalization filter 172 can be reduced while securing highly accurate distortion compensation. By reducing the tap length, the size of the circuit of the adaptive equalization filter 172 formed of a hardware circuit can be reduced and the size of the chip of the digital signal processing unit 154 including the adaptive equalization filter 172 can be reduced. Further, since the size of the circuit is reduced, power consumption in the digital signal processing unit 154 can be reduced.

In this example embodiment, the adaptive equalization filter 182 of the compensation amount calculation unit 155 used to calculate group delay ripple can be implemented by software. Since the adaptive equalization filter 182 is able to set the tap length to a desired one by software, the tap length can be easily set larger than that in the adaptive equalization filter 172 of the digital signal processing unit 154. Even when the tap length of the adaptive equalization filter 182 is long, the size of the circuit and the size of the chip do not increase although the amount of calculation and the amount of memory that is used increase.

The present inventors have conducted an experiment in order to demonstrate the performance of the distortion compensation in the configuration according to this example embodiment. In the experiment, group delay ripple of about ±20 ps was added to the optical signal using an optical device disposed in an optical transmission path by using 96-Gbaud polarization multiplexing 16QAM. The tap length of the adaptive equalization filter 172 was set to 13. The experiment has been conducted in both a case where group delay ripple was not compensated for in the optical filter 134 and a case where group delay ripple was compensated for in the optical filter 134.

Figure 12:
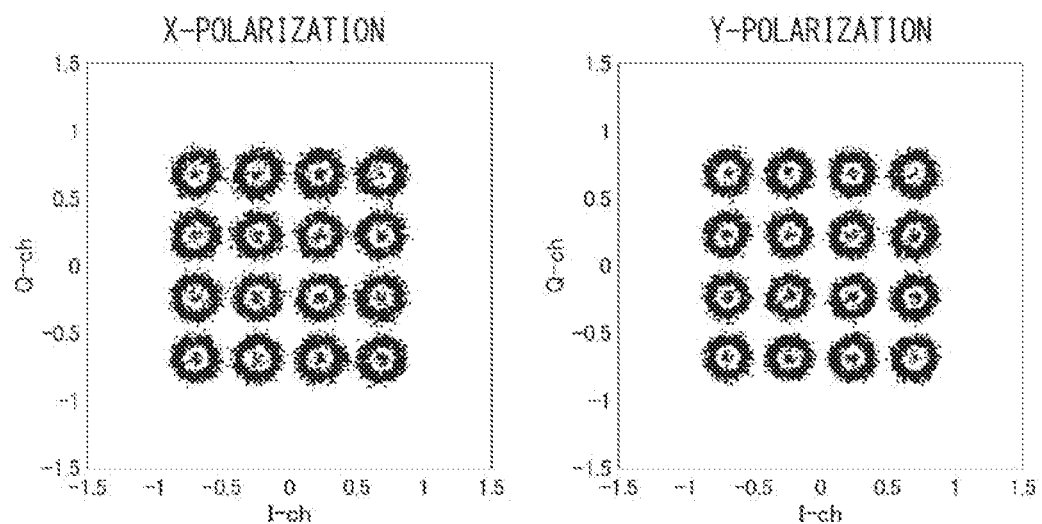
FIG. 12 is a constellation diagram illustrating an example of results of an experiment.
Figure 13:
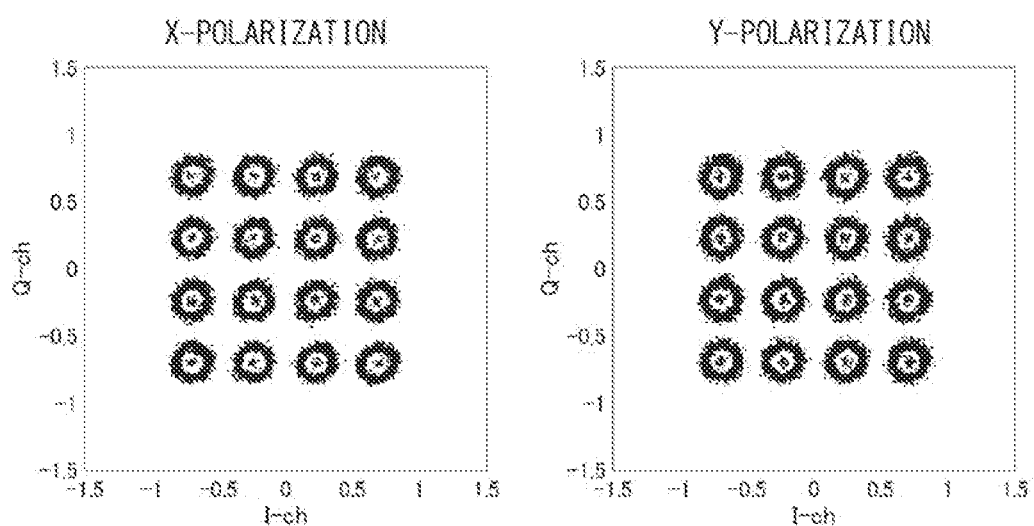
FIG. 13 is a constellation diagram illustrating another example of results of the experiment.

FIG. 12 illustrates results of the experiment in a case where the group delay ripple is not compensated for in the optical filter 134. FIG. 13 illustrates results of the experiment in a case in which the group delay ripple is compensated for in the optical filter 134. In FIGS. 12 and 13, the results of the experiment are shown as constellation diagrams in which demodulation signals of the adaptive equalization filter 172 are mapped on an IQ plane at a symbol timing. It can be understood, from the comparison between FIG. 12 and FIG. 13, that the signal quality is improved more in a case where group delay ripple is compensated for in the optical filter 134 in both the X-polarization and the Y-polarization than in a case where group delay ripple is not compensated for in both the X-polarization and the Y-polarization.

Figure 14:
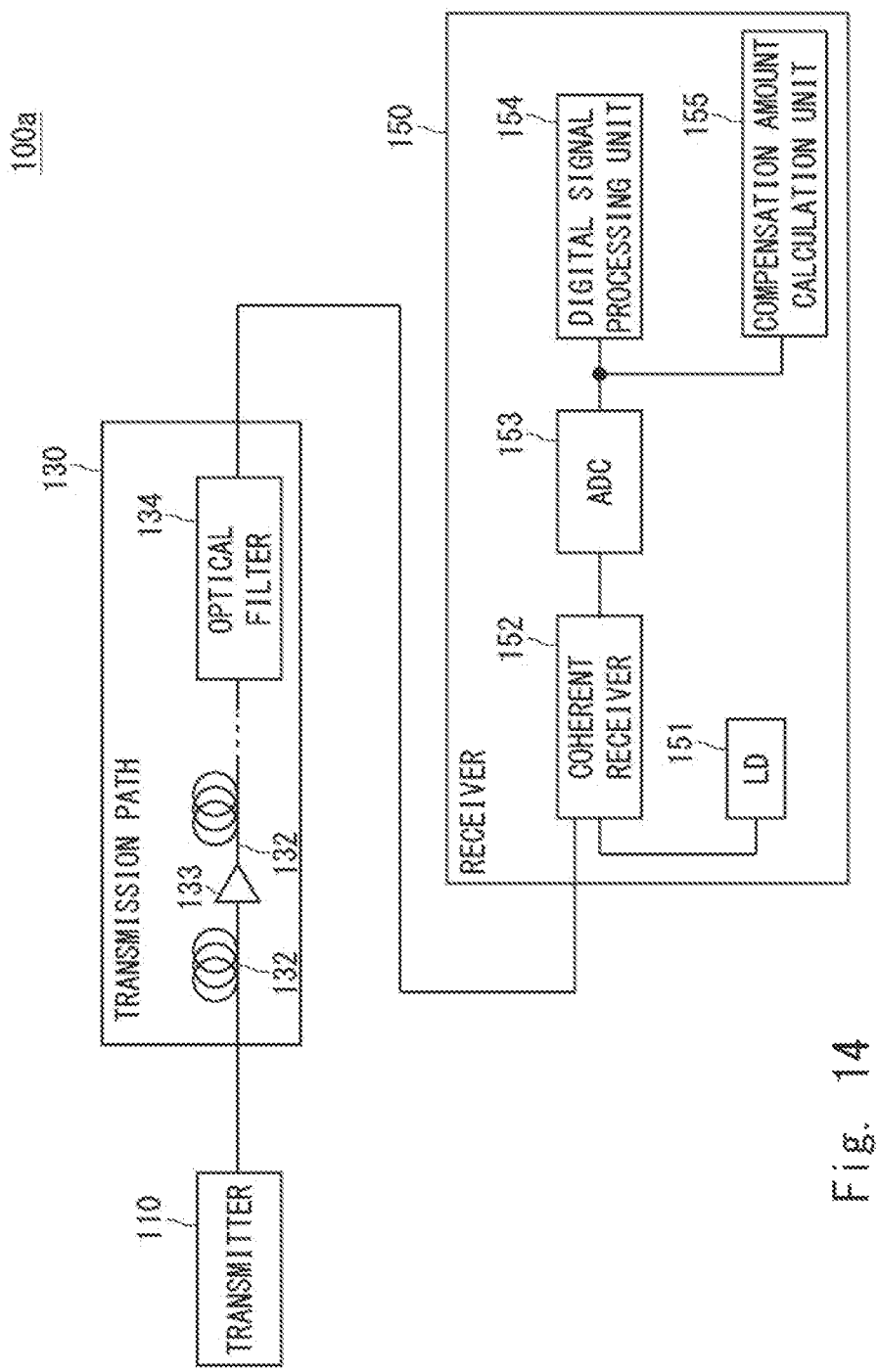
FIG. 14 is a block diagram illustrating a second communication system according to the present disclosure.

Next, a second example embodiment according to the present disclosure will be described. FIG. 14 illustrates a second communication system according to the present disclosure. In an optical fiber communication system 100$a$ shown in FIG. 14, a compensation amount calculation unit 155 feeds a compensation amount for compensating for group delay ripple back to a filter included in a digital signal processing unit 154. The filter included in the digital signal processing unit 154 compensates for the group delay ripple based on the phase response that has been fed back. The other configurations and the operations according to this example embodiment may be the same as those in the first example embodiment.

In this example embodiment, the feedback calculation unit 185 (see FIG. 6) of the compensation amount calculation unit 155 converts the group delay ripple calculated by the group delay ripple calculation unit 184 into a compensation amount applied to the chromatic dispersion compensation filter 171 (see FIG. 4) in the digital signal processing unit 154. Specifically, the feedback calculation unit 185 converts the calculated group delay ripple $\tau_r(\omega)$ into a phase response $\varphi(\omega)$ using the following expression.

$$\varphi(\omega) = -\int \tau_r(\omega) d\omega$$

The feedback calculation unit 185 feeds the phase response $\varphi(\omega)$ back to the chromatic dispersion compensation filter 171 in the digital signal processing unit 154. The chromatic dispersion compensation filter 171 compensates for, in addition to a distortion caused by chromatic dispersion, group delay ripple based on the phase response that has been fed back.

In this example embodiment, the compensation amount calculation unit 155 feeds the phase response back to the chromatic dispersion compensation filter 171 in the digital signal processing unit 154, and the chromatic dispersion compensation filter 171 compensates for, in addition to a distortion caused by chromatic dispersion, group delay ripple. In this example embodiment as well, group delay ripple is compensated for in a stage before the adaptive equalization filter 172, whereby it is possible to achieve highly accurate distortion compensation while reducing the tap length of the adaptive equalization filter 172, like in the first example embodiment. Further, in this example embodiment, group delay ripple is compensated for by the chromatic dispersion compensation filter 171, whereby a tap length that is required for the adaptive equalization filter 172 can be reduced compared to a case where group delay is compensated for in the adaptive equalization filter 172. Further, this example embodiment has an advantage that generation of the feedback and compensation of the group delay ripple can be performed on the signal receiver side. The other effects are similar to those described in the first example embodiment.

In this example embodiment, the compensation amount calculation unit 155 may feed the phase response back to the pre-equalization unit 112 included in the transmitter 110 instead of, or in addition to, feeding the phase response back to the receiver-side chromatic dispersion compensation filter 171. In this case, the compensation amount calculation unit 155 feeds the phase response back to the transmitter 110 via the transmission path 130 or any other communication path. In the transmitter 110, the pre-equalization unit 112 compensates for group delay ripple included in the optical signal received by the receiver 150 based on the phase response that has been fed back. In this case as well, it is possible to compensate for the group delay ripple in a stage before the adaptive equalization filter 172, and to achieve highly accurate distortion compensation while reducing the tap length of the adaptive equalization filter 172.

Figure 15:
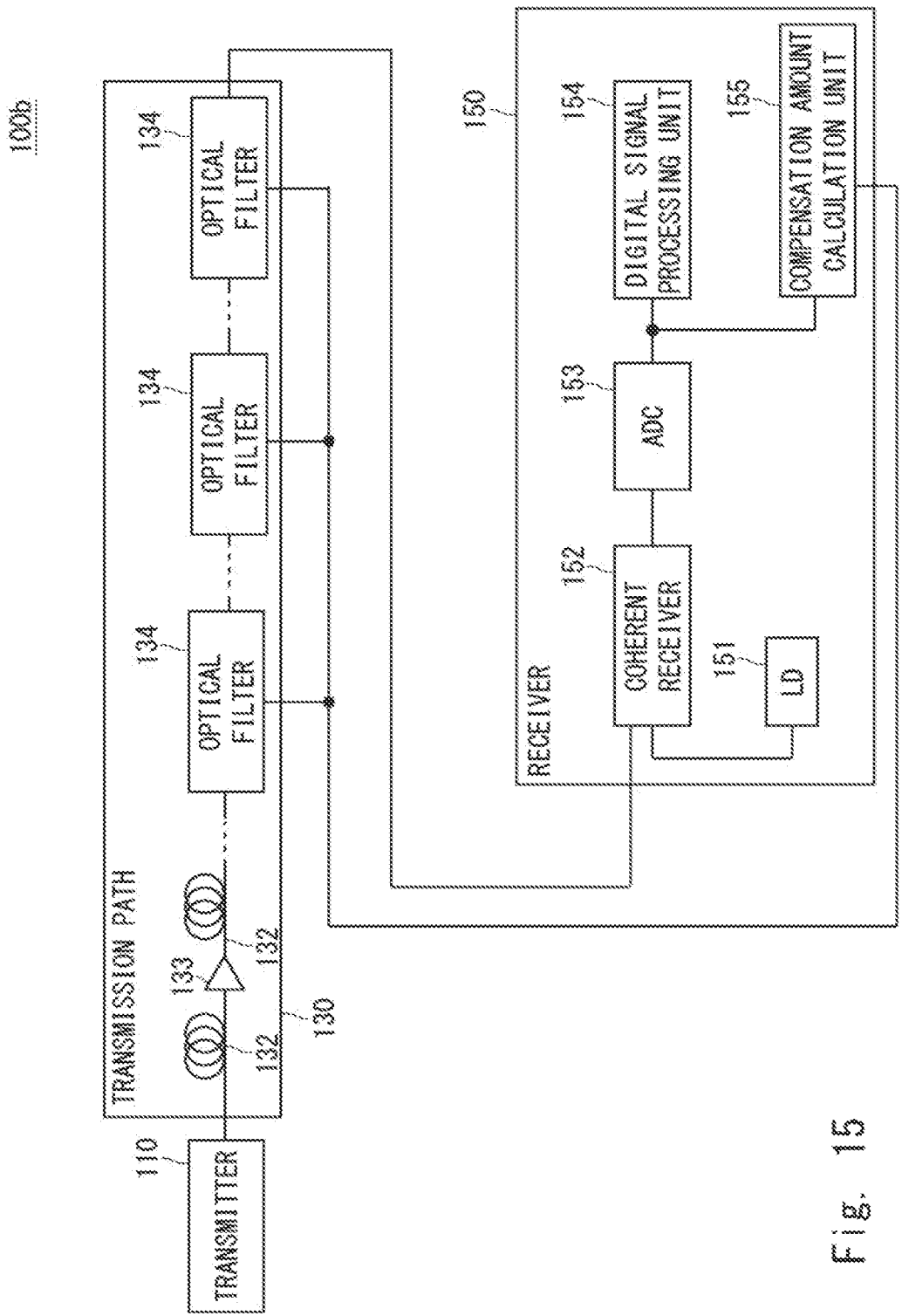
FIG. 15 is a block diagram illustrating a third communication system according to the present disclosure.

Next, a third embodiment according to the present disclosure will be described. FIG. 15 illustrates a third communication system according to the present disclosure. In an optical fiber communication system 100$b$ shown in FIG. 15, a compensation amount calculation unit 155 distributes a phase response to a plurality of filters to feed the phase response back thereto. The plurality of filters to which the phase response has been fed back compensate for group delay ripple in response to the phase response that has been fed back. The other configurations and operations may be similar to those in the first or second example embodiment.

In this example embodiment, a transmission path 130 includes a plurality of optical filters 134. The transmission path 130 includes, for example, N optical filters 134, where N is an integer equal to or larger than two. The compensation amount calculation unit 155 calculates group delay ripple, converts the calculated group delay ripple into a phase response, and feeds the phase response after the conversion back to at least one of the N optical filters 134. For example, the compensation amount calculation unit 155 feeds a value obtained by multiplying the calculated phase response by 1/N back to each of the N optical filters 134. In this case, each of the optical filters 134 compensates for 1/N of the group delay ripple, and the N optical filters 134 compensate for the group delay ripple as a whole.

Alternatively, when the calculated phase response exceeds the phase compensation range of each optical filter 134, the compensation amount calculation unit 155 may distribute the phase response to the plurality of optical filters 134 to feed the phase response back thereto. For example, the compensation amount calculation unit 155 calculates the number of optical filters that are necessary to compensate for the group delay ripple based on the calculated phase response and the phase compensation range of each optical filter 134. For example, the compensation amount calculation unit 155 calculates, when the calculated phase response is larger than twice of the phase compensation range of each optical filter 134 but is equal to or smaller than three times thereof, that the number of optical filters 134 required to compensate for group delay ripple is at least three. In this case, the compensation amount calculation unit 155 distributes the phase response to, for example, three of the N optical filters 134 to feed the phase response back thereto.

In this example embodiment, a method for distributing the phase response is not particularly limited to the aforementioned method. Further, in this example embodiment, the transmission path 130 may include an optical filter that compensates for group delay ripple in a fixed manner. Further, in this example embodiment, the compensation amount calculation unit 155 may distribute the phase response to, instead of, or in addition to, the optical filter 134, the chromatic dispersion compensation filter 171 (see FIG. 4) in the receiver 150, and the pre-equalization unit 112 in the transmitter 110.

In this example embodiment, the compensation amount calculation unit 155 distributes the phase response to the plurality of optical filters 134 to feed the phase response back thereto. In this case, even in a case where an optical filter 134 having a narrow phase compensation range is used in the transmission path 130, the phase response may be distributed to the plurality of optical filters 134 and fed back thereto, whereby group delay ripple can be compensated using the plurality of optical filters 134. The other effects are similar to those described in the first example embodiment or the second example embodiment.

Next, a fourth example embodiment according to the present disclosure will be described. A configuration of an optical fiber communication system according to this example embodiment may be similar to that of the optical fiber communication system 100 shown in FIG. 3. Alternatively, the configuration of the optical fiber communication system according to this example embodiment may be similar to that of the optical fiber communication system 100a shown in FIG. 14 or may be similar to that of the optical fiber communication system 100b shown in FIG. 15.

In this example embodiment, the compensation amount calculation unit 155 feeds the phase response back to at least one of the optical filter 134, the chromatic dispersion compensation filter 171 (see FIG. 4) in the digital signal processing unit 154, and the pre-equalization unit 112 in the transmitter 110 in such a way that the group delay ripple is at least partially compensated for. In the following description, it is assumed that the compensation amount calculation unit 155 feeds the phase response back to the adaptive equalization filter 172. Specifically, the feedback calculation unit 185 (see FIG. 6) of the compensation amount calculation unit 155 converts the group delay ripple $\tau_r(\omega)$ multiplied by the weight coefficient $\mu$ into a phase response, $\mu$ being a predetermined weight coefficient, and feeds the phase response after the conversion back to the chromatic dispersion compensation filter 171. The symbol $\mu$ is a value in a range of $0<\mu\leq1$. The chromatic dispersion compensation filter 171 compensates for the group delay ripple multiplied by the predetermined weight coefficient $\mu$.

In this example embodiment, the compensation amount calculation unit 155 calculates the group delay ripple from the reception signal in which the group delay ripple multiplied by the predetermined weight coefficient $\mu$ is compensated for, converts the group delay ripple multiplied by the predetermined weight coefficient $\mu$ into a phase response, and feeds the phase response after the conversion back to the chromatic dispersion compensation filter 171. In other words, the compensation amount calculation unit 155 causes the chromatic dispersion compensation filter 171 to repeatedly execute compensation of the group delay ripple multiplied by the predetermined weight coefficient $\mu$. The compensation amount calculation unit 155 may calculate, for example, the difference between the minimum value and the maximum value of the group delay, and feed, when the calculated difference is equal to or larger than a predetermined threshold, the phase response after the conversion back to the chromatic dispersion compensation filter 171. In other words, the compensation amount calculation unit 155 may cause the chromatic dispersion compensation filter 171 to repeatedly execute compensation of the group delay ripple multiplied by the predetermined weight coefficient $\mu$ until the difference between the minimum value and the maximum value of the group delay becomes smaller than a predetermined threshold.

Figure 16:
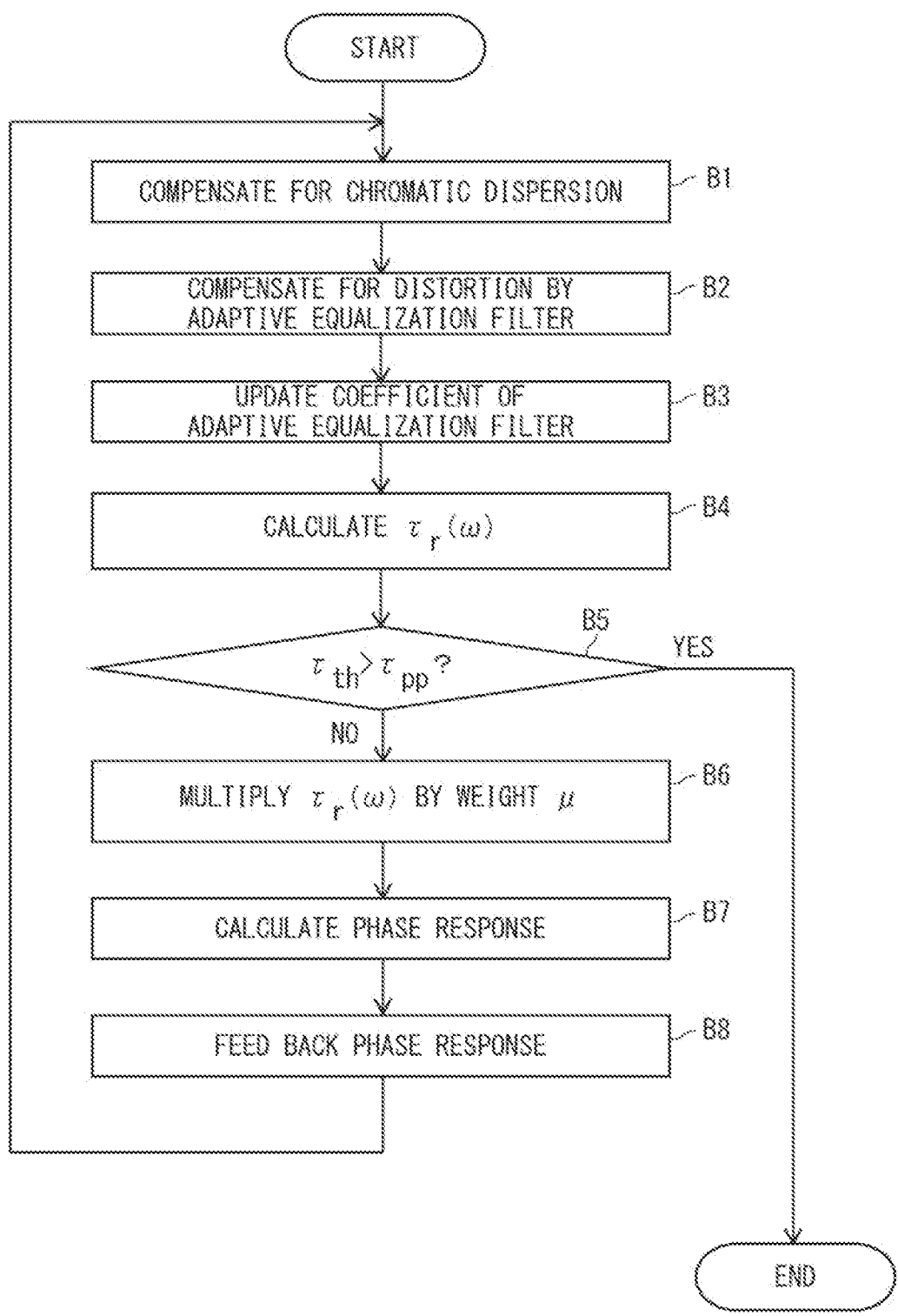
FIG. 16 is a flowchart illustrating an operation procedure of the compensation amount calculation unit.

Next, an operation procedure according to this example embodiment will be described. FIG. 16 illustrates an operation procedure of the compensation amount calculation unit 155. The reception signals converted into the digital signals by the ADC 153 (see FIG. 3) are input to the chromatic dispersion compensation filter 181. The chromatic dispersion compensation filter 181 compensates for chromatic dispersion (Step B1) and outputs the reception signals in which the chromatic dispersion is compensated to the adaptive equalization filter 182. The adaptive equalization filter 182 compensates for various kinds of distortion included in the reception signal (Step B2). The coefficient updating unit 183 adaptively updates the coefficient of the adaptive equalization filter 182 (Step B3).

The group delay ripple calculation unit 184 calculates the group delay ripple $\tau_r(\omega)$ from the coefficient of the adaptive equalization filter 182 (Step B4). The feedback calculation unit 185 compares the difference between the minimum value and the maximum value of the group delay with the predetermined threshold $\tau_{th}$. The difference between the minimum value and the maximum value of the group delay, that is, a peak-to-peak value $\tau_{pp}$ of the group delay ripple can be calculated by $\tau_{pp}=\max(\tau(\omega))-\min((\tau(\omega))$. The feedback calculation unit 185 determines whether or not $\tau_{pp}$ is smaller than the threshold $\tau_{th}$ (Step B5). When the feedback calculation unit 185 has determined that $\tau_{pp}$ is smaller than the threshold $\tau_{th}$, the processing is ended.

When it is determined that $\tau_{pp}$ is not smaller than the threshold $\tau_{th}$ in Step B5, that is, when it is determined that $\tau_{pp}$ is equal to or larger than the threshold $\tau_{th}$, the feedback calculation unit 185 multiplies the group delay ripple $\tau_r(\omega)$ calculated in Step B4 by the weight coefficient $\mu$ (Step B6). The feedback calculation unit 185 calculates the phase response $\varphi(\omega)$ from the group delay ripple $\tau_r(\omega)$ multiplied by the weight coefficient $\mu$, that is, $\mu\times\tau_r(\omega)$ (Step B7). The feedback calculation unit 185 feeds the phase response calculated in Step B7 back to the chromatic dispersion compensation filter 171 (Step B8). The chromatic dispersion compensation filter 171 at least partially compensates for the group delay ripple based on the phase response that has been fed back. After that, the processing returns to Step B1, where calculation of the group delay ripple and the like is repeatedly performed.

The group delay ripple calculated by the group delay ripple calculation unit 184 includes a calculation error or an estimation error. Therefore, when the chromatic dispersion compensation filter 171 is caused to compensate for all the calculated group delay ripple, the reception quality may be reduced due to the estimation error.

In this example embodiment, the feedback calculation unit 185 causes the chromatic dispersion compensation filter 171 to compensate for at least a part of the group delay ripple. In this example embodiment, the group delay ripple $\mu\times\tau_r(\omega)$ is compensated for, not the group delay ripple $\tau_r(\omega)$. Therefore, at a timing when it is determined in Step B5 of FIG. 16 that $\tau_{pp}$ is smaller than the threshold $\tau_{th}$ and the processing is ended, the compensation error remains. The residual compensation error changes in accordance with the weight coefficient $\mu$ and the threshold $\tau_{th}$ of the difference between the maximum value and the minimum value of the group delay. However, it is considered that the compensation error according to this example embodiment can be made smaller than the estimation error of the group delay ripple in a case where all the group delay ripple are compensated for. In this example embodiment, by repeatedly performing a partial compensation of the group delay ripple, it is possible to reduce degradation in the reception quality caused by the estimation error of group delay ripple, and improve the reception quality.

In each of the example embodiments, an example in which the receiver 150 includes the compensation amount calculation unit 155 has been described. However, the present disclosure is not limited thereto. The compensation amount calculation unit 155 may be configured as a separate apparatus that is independent from the receiver 150. In other words, it is not necessary that the compensation amount calculation unit 155 configure a part of the receiver 150, and the receiver 150 and the compensation amount calculation unit 155 may be different apparatuses physically separated from each other.

Figure 17:
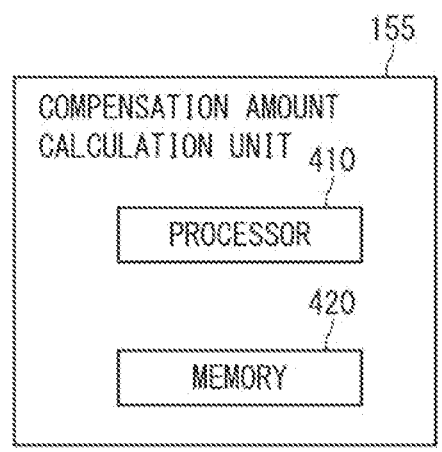
FIG. 17 is a block diagram illustrating a physical configuration example of the compensation amount calculation unit.

Note that, in the above-described example embodiment, the compensation amount calculation unit 155 may be configured as any digital signal processing circuit or apparatus. FIG. 17 illustrates a physical configuration example of the compensation amount calculation unit 155. The compensation amount calculation unit 155 includes one or more processors 410 and one or more memories 420. The processor 410 reads out a program stored in the memory 420 and executes the program that has been read out, thereby achieving the function of each part shown in FIG. 6 by software.

The above program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a Compact Disc (CD), a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

The communication system, the receiver, the compensation amount calculation apparatus, the distortion compensation method, and a non-transitory computer readable medium according to the present disclosure are able to execute highly accurate distortion compensation while reducing a tap length in an adaptive equalization filter in which coefficients are adaptively controlled.

Although embodiments of the present disclosure have been described in detail, the present disclosure is not limited to the embodiments described above, and changes and modifications made to the embodiments without departing from the spirit of the present disclosure are included in the present disclosure. The first, second, third, and fourth embodiments can be combined as desirable by one of ordinary skill in the art.

For example, all or some of the embodiments disclosed above can be described like in, but not limited to, the following supplementary notes.

Supplementary Note 1

A compensation amount calculation apparatus comprising:
a distortion compensation filter compensating for a distortion included in a reception signal obtained by performing coherent reception of a signal transmitted from a transmitter via a transmission path in a receiver, filter coefficient of the distortion compensation filter being adaptively controlled;
a group delay ripple calculation unit configured to calculate, based on the filter coefficient of the distortion compensation filter, a group delay included in the reception signal and calculate group delay ripple from the calculated group delay; and
a feedback calculation unit configured to calculate a phase response based on the calculated group delay ripple, feed the calculated phase response back to one or more filters having a phase compensation function disposed in a stage before an adaptive equalization filter included in the receiver, and cause the one or more filters having the phase compensation function to at least partially compensate for the group delay ripple.

Supplementary Note 2

The compensation amount calculation apparatus according to Supplementary Note 1, wherein the one or more filters having the phase compensation function comprise at least one of an optical filter disposed in the transmission path, a filter disposed in a transmitter, and a filter disposed in a receiver.

Supplementary Note 3

The compensation amount calculation apparatus according to Supplementary Note 1 or 2, wherein
the signal transmitted from the transmitter is multiplexed with a first polarization and a second polarization, and
the distortion compensation filter comprises a 2×1 multi-input-single-output (MISO) filter that receives a complex signal that corresponds to a first polarization component of the reception signal and a complex signal that corresponds to a second polarization component of the reception signal and outputs one complex signal.

Supplementary Note 4

The compensation amount calculation apparatus according to any one of Supplementary Notes 1 to 3, wherein a tap length of the distortion compensation filter is larger than a tap length of the adaptive equalization filter included in the receiver.

Supplementary Note 5

The compensation amount calculation apparatus according to any one of Supplementary Notes 1 to 4, wherein the feedback calculation unit distributes the calculated phase response to a plurality of filters having the phase compensation function to feed the phase response back thereto.

Supplementary Note 6

The compensation amount calculation apparatus according to any one of Supplementary Notes 1 to 5, wherein the feedback calculation unit multiplies the calculated group delay ripple by a weight coefficient and converts the group delay ripple multiplied by the weight coefficient into the phase response.

Supplementary Note 7

The compensation amount calculation apparatus according to Supplementary Note 6, wherein the feedback calculation unit calculates a difference between a maximum value and a minimum value of the group delay and feeds the converted phase response back to the one or more filters having the phase compensation function when the calculated difference is equal to or larger than a threshold.

Supplementary Note 8

A receiver comprising:
a reception circuit that performs coherent reception of a signal transmitted from a transmitter via a transmission path; and
a chromatic dispersion compensation filter, which is a filter having a phase compensation function, that compensates for a distortion caused by chromatic dispersion included in the reception signal that is coherent-received;
an adaptive equalization filter adaptively compensating for the distortion included in the reception signal in which the distortion has been compensated for by the chromatic dispersion compensation filter, filter coefficients of the adaptive equalization filter being adaptively controlled;
a signal reproducing circuit configured to perform demodulation and decoding on the reception signal in which the distortion has been compensated for by the adaptive equalization filter; and
the compensation amount calculation apparatus according to any one of Supplementary Notes 1 to 7.

Supplementary Note 9

The receiver according to Supplementary Note 8, wherein the reception signal that is coherent-received by the reception circuit is branched and the branched reception signal is input to the distortion compensation filter of the compensation amount calculation apparatus.

Supplementary Note 10

The receiver according to Supplementary Note 8 or 9, wherein
the feedback calculation unit of the compensation amount calculation apparatus feeds the phase response back to the chromatic dispersion compensation filter of the receiver, and
the chromatic dispersion compensation filter compensates for the group delay ripple included in the reception signal based on the phase response that has been fed back.

Supplementary Note 11

The receiver according to any one of Supplementary Notes 8 to 10, wherein
the signal transmitted from the transmitter is multiplexed with a first polarization and a second polarization, and
the adaptive equalization filter comprises a 2×2 multi-input-multi-output (MIMO) filter that receives a complex signal that corresponds to a first polarization component of the reception signal and a complex signal that corresponds to a second polarization component of the reception signal and outputs a complex signal that corresponds to a first polarization and a complex signal that corresponds to a second polarization.

Supplementary Note 12

A communication system comprising:
a transmitter configured to transmit a signal via a transmission path;
a receiver configured to receive the transmitted signal; and
the compensation amount calculation apparatus according to any one of Supplementary Notes 1 to 7.

Supplementary Note 13

The communication system according to Supplementary Note 12, wherein
the receiver comprises:
a reception circuit configured to perform coherent reception of the signal transmitted from the transmitter via the transmission path;
a chromatic dispersion compensation filter, which is a filter having a phase compensation function, that compensates for a distortion caused by chromatic dispersion included in the reception signal that is coherent-received;
an adaptive equalization filter adaptively compensating for the distortion included in the reception signal in which the distortion has been compensated for by the chromatic dispersion compensation filter, filter coefficients of the adaptive equalization filter being adaptively controlled; and
a signal reproducing circuit configured to perform demodulation and decoding on the reception signal in which the distortion has been compensated for by the adaptive equalization filter, and
the feedback calculation unit of the compensation amount calculation apparatus feeds the phase response back to the chromatic dispersion compensation filter.

Supplementary Note 14

The communication system according to Supplementary Note 12 or 13, wherein
the transmission path comprises an optical filter having a phase compensation function, and
the feedback calculation unit of the compensation amount calculation apparatus feeds the phase response back to the optical filter.

Supplementary Note 15

The communication system according to any one of Supplementary Notes 12 to 14, wherein
the transmitter comprises:
an encoder configured to encode a transmitted signal;
a pre-equalizer configured to execute pre-equalization on the encoded signal; and
a modulator configured to modulate the signal on which pre-equalization has been executed and output the modulated signal to the transmission path,
the pre-equalizer comprises a filter having a phase compensation function, and the feedback calculation unit of the compensation amount calculation apparatus feeds the phase response back to the filter having the phase compensation function of the pre-equalizer.

Supplementary Note 16

A distortion compensation method comprising:
inputting, to a distortion compensation filter, a reception signal obtained by performing coherent reception of a signal transmitted from a transmitter via a transmission path by a receiver and adaptively controlling a filter coefficient of the distortion compensation filter, thereby compensating for a distortion included in the reception signal;
calculating a group delay included in the reception signal based on the filter coefficient of the distortion compensation filter and calculating group delay ripple from the calculated group delay; and
calculating a phase response based on the calculated group delay ripple and feeding the calculated phase response back to one or more filters having a phase compensation function disposed in a stage before an adaptive equalization filter included in the receiver, thereby causing the one or more filters having the phase compensation function to at least partially compensate for the group delay ripple.

Supplementary Note 17

A program for causing a processor to execute processing including:
inputting, to a distortion compensation filter, a reception signal obtained by performing coherent reception of a signal transmitted from a transmitter via a transmission path by a receiver and adaptively controlling a filter coefficient of the distortion compensation filter, thereby compensating for a distortion included in the reception signal;
calculating a group delay included in the reception signal based on the filter coefficient of the distortion compensation filter and calculating group delay ripple from the calculated group delay; and
calculating a phase response based on the calculated group delay ripple and feeding the calculated phase response back to one or more filters having a phase compensation function disposed in a stage before an adaptive equalization filter included in the receiver, thereby causing the one or more filters having the phase compensation function to at least partially compensate for the group delay ripple.

What is claimed is:

1. A compensation amount calculation apparatus comprising:
a distortion compensation filter compensating for a distortion included in a reception signal obtained by performing coherent reception of a signal transmitted from a transmitter via a transmission path in a receiver, filter coefficients of the distortion compensation filter being adaptively controlled;
at least one memory storing instructions; and
a processor configured to execute the instructions to:
calculate a group delay included in the reception signal based on the filter coefficient of the distortion compensation filter and calculate group delay ripple from the calculated group delay; and
calculate a phase response based on the calculated group delay ripple, feed the calculated phase response back to one or more filters having a phase compensation function disposed in a stage before an adaptive equalization filter included in the receiver, and cause the one or more filters having the phase compensation function to at least partially compensate for the group delay ripple.

2. The compensation amount calculation apparatus according to claim 1, wherein the one or more filters having the phase compensation function comprise at least one of an optical filter disposed in the transmission path, a filter disposed in a transmitter, or a filter disposed in a receiver.

3. The compensation amount calculation apparatus according to claim 1, wherein
the signal transmitted from the transmitter is multiplexed with a first polarization and a second polarization, and
the distortion compensation filter comprises a 2×1 multi-input-single-output (MISO) filter that receives a complex signal that corresponds to a first polarization component of the reception signal and a complex signal that corresponds to a second polarization component of the reception signal and outputs one complex signal.

4. The compensation amount calculation apparatus according to claim 1, wherein a tap length of the distortion compensation filter is larger than a tap length of the adaptive equalization filter included in the receiver.

5. The compensation amount calculation apparatus according to claim 1, wherein the at least one processor is configured to execute the instructions to distribute the calculated phase response to a plurality of filters having the phase compensation function to feed the phase response back thereto.

6. The compensation amount calculation apparatus according to claim 1, wherein the at least one processor is configured to execute the instructions to multiply the calculated group delay ripple by a weight coefficient and convert the group delay ripple multiplied by the weight coefficient into the phase response.

7. The compensation amount calculation apparatus according to claim 6, wherein the at least one processor is configured to execute the instructions to calculate a difference between a maximum value and a minimum value of the group delay and feeds the converted phase response back to the one or more filters having the phase compensation function when the calculated difference is equal to or larger than a threshold.

8. A receiver comprising:
a reception circuit that performs coherent reception of a signal transmitted from a transmitter via a transmission path; and
a chromatic dispersion compensation filter, which is a filter having a phase compensation function, that compensates for a distortion caused by chromatic dispersion included in the reception signal that is coherent-received;
an adaptive equalization filter adaptively compensating for the distortion included in the reception signal in which the distortion has been compensated for by the chromatic dispersion compensation filter, filter coefficients of the adaptive equalization filter being adaptively controlled;
a signal reproducing circuit configured to perform demodulation and decoding on the reception signal in which the distortion has been compensated for by the adaptive equalization filter; and the compensation amount calculation apparatus according to claim 1.

9. The receiver according to claim 8, wherein the reception signal that is coherent-received by the reception circuit is branched and the branched reception signal is input to the distortion compensation filter of the compensation amount calculation apparatus.

10. The receiver according to claim 8, wherein
the at least one processor is configured to execute the instructions to feed the phase response back to the chromatic dispersion compensation filter of the receiver, and
the chromatic dispersion compensation filter compensates for the group delay ripple included in the reception signal based on the phase response that has been fed back.

11. The receiver according to claim 8, wherein
the signal transmitted from the transmitter is multiplexed with a first polarization and a second polarization, and
the adaptive equalization filter comprises a 2×2 multi-input-multi-output (MIMO) filter that receives a complex signal that corresponds to a first polarization component of the reception signal and a complex signal that corresponds to a second polarization component of the reception signal and outputs a complex signal that corresponds to a first polarization and a complex signal that corresponds to a second polarization.

12. A communication system comprising:
a transmitter configured to transmit a signal via a transmission path;
a receiver configured to receive the transmitted signal; and
the compensation amount calculation apparatus according to claim 1.

13. The communication system according to claim 12, wherein
the receiver comprises:
a reception circuit configured to perform coherent reception of the signal transmitted from the transmitter via the transmission path;
a chromatic dispersion compensation filter, which is a filter having a phase compensation function, that compensates for a distortion caused by chromatic dispersion included in the reception signal that is coherent-received;
an adaptive equalization filter adaptively compensating for the distortion included in the reception signal in which the distortion has been compensated for by the chromatic dispersion compensation filter, filter coefficients of the adaptive equalization filter being adaptively controlled; and
a signal reproducing circuit configured to perform demodulation and decoding on the reception signal in which the distortion has been compensated for by the adaptive equalization filter, and
the at least one processor is configured to execute the instructions to feed the phase response back to the chromatic dispersion compensation filter.

14. The communication system according to claim 12, wherein
the transmission path comprises an optical filter having a phase compensation function, and
the at least one processor configured to execute the instructions to feed the phase response back to the optical filter.

15. The communication system according to claim 12, wherein
the transmitter comprises:
an encoder configured to encode a transmitted signal;
a pre-equalizer configured to execute pre-equalization on the encoded signal; and
a modulator configured to modulate the signal on which pre-equalization has been executed and output the modulated signal to the transmission path,
the pre-equalizer comprises a filter having a phase compensation function, and
the at least one processor is configured to execute the instructions to feed the phase response back to the filter having the phase compensation function of the pre-equalizer.

16. A distortion compensation method comprising:
inputting, to a distortion compensation filter, a reception signal obtained by performing coherent reception of a signal transmitted from a transmitter via a transmission path by a receiver and adaptively controlling a filter coefficient of the distortion compensation filter, thereby compensating for a distortion included in the reception signal;
calculating a group delay included in the reception signal based on the filter coefficient of the distortion compensation filter and calculating group delay ripple from the calculated group delay; and
calculating a phase response based on the calculated group delay ripple and feeding the calculated phase response back to one or more filters having a phase compensation function disposed in a stage before an adaptive equalization filter included in the receiver, thereby causing the one or more filters having the phase compensation function to at least partially compensate for the group delay ripple.

17. A non-transitory computer readable medium storing a program for causing a processor to execute processing including:
inputting, to a distortion compensation filter, a reception signal obtained by performing coherent reception of a signal transmitted from a transmitter via a transmission path by a receiver and adaptively controlling a filter coefficient of the distortion compensation filter, thereby compensating for a distortion included in the reception signal;
calculating a group delay included in the reception signal based on the filter coefficient of the distortion compensation filter and calculating group delay ripple from the calculated group delay; and
calculating a phase response based on the calculated group delay ripple and feeding the calculated phase response back to one or more filters having a phase compensation function disposed in a stage before an adaptive equalization filter included in the receiver, thereby causing the one or more filters having the phase compensation function to at least partially compensate for the group delay ripple.

* * * * *